US009720402B2

(12) United States Patent
Vartiainen et al.

(10) Patent No.: US 9,720,402 B2
(45) Date of Patent: Aug. 1, 2017

(54) METHOD AND DEVICE FOR MONITORING AND CONTROLLING AN INDUSTRIAL PROCESS

(71) Applicant: ABB TECHNOLOGY LTD, Zürich (CH)

(72) Inventors: Elina Vartiainen, Västerås (SE); Peder Boberg, Umeå (SE); Oskar Qvarnström, Umeå (SE)

(73) Assignee: ABB SCHWEIZ AG, Baden (CH)

( * ) Notice: Subject to any disclaimer, the term of this patent is extended or adjusted under 35 U.S.C. 154(b) by 275 days.

(21) Appl. No.: 14/759,626

(22) PCT Filed: Feb. 25, 2013

(86) PCT No.: PCT/EP2013/053656
§ 371 (c)(1),
(2) Date: Jul. 7, 2015

(87) PCT Pub. No.: WO2014/127836
PCT Pub. Date: Aug. 28, 2014

(65) Prior Publication Data
US 2015/0355632 A1 Dec. 10, 2015

(51) Int. Cl.
*G05B 19/418* (2006.01)

(52) U.S. Cl.
CPC ..... *G05B 19/418* (2013.01); *G05B 19/41875* (2013.01); *G05B 2219/32014* (2013.01); *G05B 2219/36167* (2013.01); *Y02P 90/22* (2015.11)

(58) Field of Classification Search
None
See application file for complete search history.

(56) References Cited

U.S. PATENT DOCUMENTS 6,898,476 B2 5/2005 Watanabe et al.
7,377,650 B2 5/2008 Simon
7,831,654 B1 11/2010 Magsamen, Jr. et al.
(Continued)

FOREIGN PATENT DOCUMENTS

GB 2478039 A 8/2011
WO WO 2007/066166 A1 6/2007
WO WO 2012/004316 A1 1/2012

*Primary Examiner* — Ryan Jarrett
(74) *Attorney, Agent, or Firm* — Birch, Stewart, Kolasch & Birch, LLP

(57) ABSTRACT

The present disclosure relates to a method for facilitating monitoring and control of an industrial process by means of a portable device comprising a projector arranged to project process graphics associated with process components of the industrial process. The method comprises a) obtaining, by means of the portable device, process component identification data of a process component; b) obtaining distance data for determining a distance between the portable device and the process component; and c) obtaining a process graphics image based on the process component identification data and the distance data for projection by the portable device, wherein the process graphics image is associated with a portion of the industrial process comprising the process component, and wherein information contained in the process graphics image is based on the distance between the portable device and the process component. The present disclosure further relates to a computer program and to a portable device.

20 Claims, 2 Drawing Sheets

(56) References Cited

U.S. PATENT DOCUMENTS

| | | | | |
|---|---|---|---|---|
| 8,322,863 | B1 * | 12/2012 | Cho | H04N 9/3194<br>353/70 |
| 2004/0201823 | A1 | 10/2004 | Raskar et al. | |
| 2005/0237020 | A1 | 10/2005 | Horstmann | |
| 2006/0152478 | A1 | 7/2006 | Simon | |
| 2011/0111849 | A1 | 5/2011 | Sprague et al. | |
| 2012/0214546 | A1 * | 8/2012 | Osaka | H04M 1/0272<br>455/556.1 |

* cited by examiner

METHOD AND DEVICE FOR MONITORING AND CONTROLLING AN INDUSTRIAL PROCESS

TECHNICAL FIELD

The present disclosure generally relates to industrial process monitoring and control. In particular it relates to a method which facilitates monitoring and control of an industrial process, a computer program comprising computer-executable code for performing the method, and to a portable device.

BACKGROUND

Industrial processes in such diverse fields as pulp and paper, oil and gas, heat and power generation, metals and mining, and the chemical industry generally comprise a plurality of process components, i.e. process equipment, for carrying out various process steps. In an industrial process, sensors are typically arranged to measure industrial process component related data, such as process variable values, which are associated with the process components. The measured process variable values are used for controlling the process variables by means of controllers in accordance with setpoint values.

Large scale industrial processes comprise a great plurality of sensors and control loops and can for example be monitored and controlled by means of a distributed control system (DCS) or a supervisory control and data acquisition (SCADA) system, which allows monitoring and control of the entire industrial process. These systems are arranged to receive measurement data, e.g. process variable data, from the plurality of sensors for monitoring purposes. The measurement data received by the DCS or SCADA system is presented to process operators supervising the industrial process. Process operators may thereby monitor the entire industrial process, usually through a plurality of large screens which together display information of the entire industrial process and allow cooperation between the process operators, facilitating decision making.

Process engineers or other plant/industrial process monitoring personnel occasionally need to perform maintenance work or other operations in a process component environment, e.g. a plant. To facilitate their work, they may utilise portable radio devices, i.e. portable radio communication enabled devices, which provides a communication link to the control system(s) and/or SCADA system such that information concerning process components of the industrial process may be obtained in essentially any location.

A problem with existing portable radio devices used in a industrial process monitoring and/or control context is that in some cases they may not be able to provide the same opportunities to monitor and/or control process components as would otherwise be possible e.g. via stationary workstations in a control room. Moreover, portable radio communication enabled devices can limit the cooperation between maintenance personnel rendering decision-making more difficult.

SUMMARY

In view of the above, a general object of the present disclosure is to facilitate the monitoring and control of an industrial process. In particular, it would be desirable to be able to provide a method and portable device which allows maintenance personnel to efficiently cooperate to improve decision-making in an industrial process environment.

Hence, according to a first aspect of the present disclosure there is provided a method for facilitating monitoring and control of an industrial process by means of a portable device comprising a projector arranged to project process graphics associated with process components of the industrial process, wherein the method comprises:

a) obtaining, by means of the portable device, process component identification data of a process component, b) obtaining distance data for determining a distance between the portable device and the process component, and c) obtaining a process graphics image based on the process component identification data and the distance data for projection by the portable device, wherein the process graphics image is associated with a portion of the industrial process comprising the process component, and wherein information contained in the process graphics image is based on the distance between the portable device and the process component.

An effect which may be obtainable thereby is that the process graphics image, containing a representation of the process component of interest, may be projected by means of the projector of the portable device such that several process engineers or maintenance personnel are able to view the process graphics image simultaneously when they are located in an industrial process environment, e.g. a plant. Simultaneous viewing of the process graphics image allows for discussions and facilitates decision making concerning monitoring and control. Moreover, the information contained in the process graphics image is based on the distance between the portable device and the process component. Hence, information in the process graphics image may be influenced by moving the portable device closer to or further away from the process component. For example, more detailed information concerning objects displayed in the process graphics image may be projected when the portable device is moved closer to the process component and a view containing additional objects may be projected when the portable device is moved further away from the process component. The movement towards and away from the process component may be seen as a zooming feature which depends on the distance between the process component and the portable device. Thereby focus may be put on a specific portion of the process graphics removing unnecessary details, further facilitating cooperation between maintenance personnel.

One embodiment comprises obtaining an orientation of the projector of the portable device relative to the process component, wherein in step c) the information contained in the process graphics image is further based on the obtained orientation.

One embodiment comprises determining a size of the process graphics image based on the obtained distance.

One embodiment comprises obtaining data from a tag arranged on the process component, wherein the step of obtaining the distance is based on the data obtained from the tag.

One embodiment comprises comparing a size of the tag with a reference size of a tag based on the data obtained from the tag arranged on the process component.

According to one embodiment step a) of obtaining comprises obtaining identification data from a tag arranged on the process component.

According to one embodiment the step of obtaining the orientation of the projector of the portable device relative to the process component comprises obtaining data from a tag arranged on the process component, wherein the orientation is obtained based on the data obtained from the tag.

One embodiment comprises comparing a location of the tag with a tag of a reference model of the process component based on the data obtained from the tag arranged on the process component.

One embodiment comprises projecting the process graphics image onto the process component.

One embodiment comprises obtaining a selection, via the portable device, of a representation of the process component displayed in the process graphics image.

One embodiment comprises obtaining a user command and controlling the process component based on the user command.

According to one embodiment the process graphics image obtained in step c) depicts a larger portion of the process graphics describing the industrial process the greater the distance between the portable device and the process component is.

According to one embodiment the step of obtaining an orientation of the projector of the portable device relative to the process component determines which portion of the process graphics describing the industrial process and containing a representation of the process component is obtained in the process graphics image in step c).

According to one embodiment the method is carried out by the portable device.

According to one embodiment the method is carried out by a control system of the industrial process.

According to a second aspect of the present disclosure there is provided a computer program comprising computer-executable components for causing a portable device to perform the steps recited in according to the first aspect when the computer-executable components are run on a processor included in the portable device.

According to a third aspect of the present disclosure there is provided a portable device for facilitating monitoring and control of an industrial process. The portable device comprises a projector, and a processor comprising computer executable components arranged to perform the steps of the first aspect.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example, so that this disclosure will be thorough and complete, and will fully convey the scope of the inventive concept to those skilled in the art. Like numbers refer to like elements throughout the description.

Figure 1:
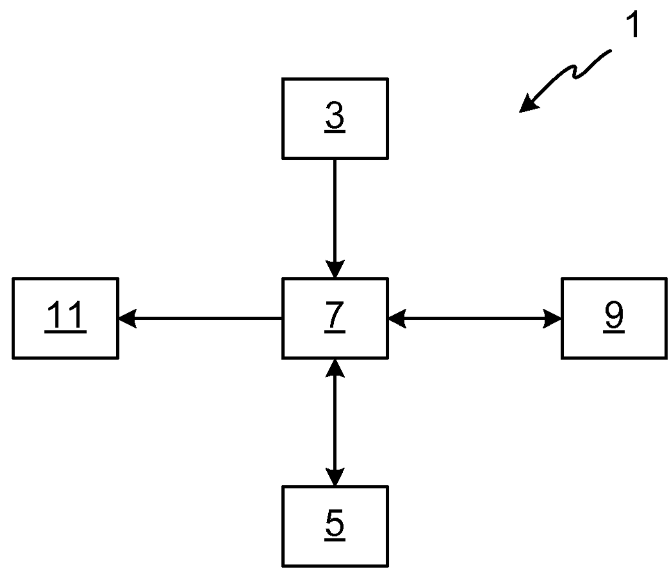
FIG. 1 is a schematic view of a portable device.

FIG. 1 depicts an example of an arrangement 1 which facilitates monitoring and control of an industrial process. In the following, the arrangement 1 will be exemplified by a portable device 1, but it is to be noted that the arrangement could also be a distributed system of a portable projector with a processor and a stationary industrial control system for example. The portable device 1 may for example be a smartphone, a tablet computer, or a portable radio communication device specifically designed and built for the purpose of industrial monitoring and control. The portable device 1 is thus preferably a portable radio communication device.

The portable device 1 is arranged to communicate with an industrial control system and comprises an input unit 3, an antenna 5, a processor 7, a memory 9, and a projector 11. The memory 9 comprises a computer program having computer-executable components which when loaded into the processor 7 performs at least one step of the herein disclosed method for facilitating monitoring and controlling an industrial process. In case the portable device 1 is a smartphone or a tablet computer, the computer program may advantageously be in the form a downloadable application.

The input unit 3 may for example be a touch screen or a track pad via which user input may be provided to the portable device 1. The projector 11, which preferably is a pico projector, may be a separate unit which is attachable to the portable device 1. Alternatively, the projector may be integrated with the portable device 1.

Portable device 1 is arranged to communicate wirelessly with an industrial control system such as a DCS or a SCADA system to obtain process graphic images of an industrial process and to project the process graphics images by means of the projector. Process graphics are defined by a plurality of process component representations of process components involved in performing process steps of the industrial process. A process component may for example be a tank, a valve, a turbine, a roller or a cluster or rollers for a pulp and paper mill, drying equipment, a refiner, a generator, a motor, a transformer, or a boiler.

Figure 2A:
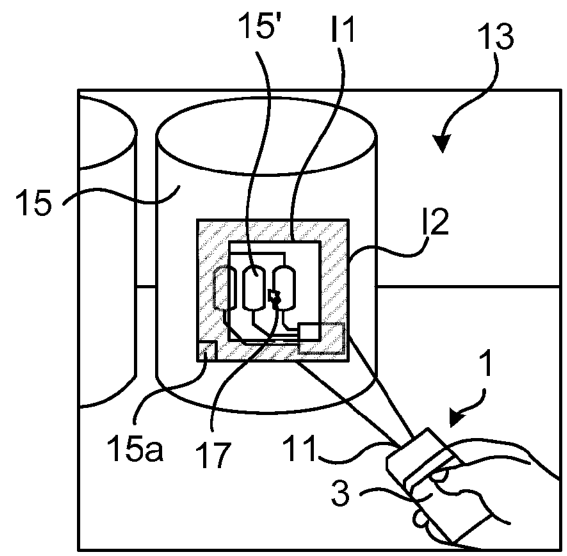
FIGS. 2*a-d* shows an example of the portable device in FIG. 1 in operation.
Figure 2B:
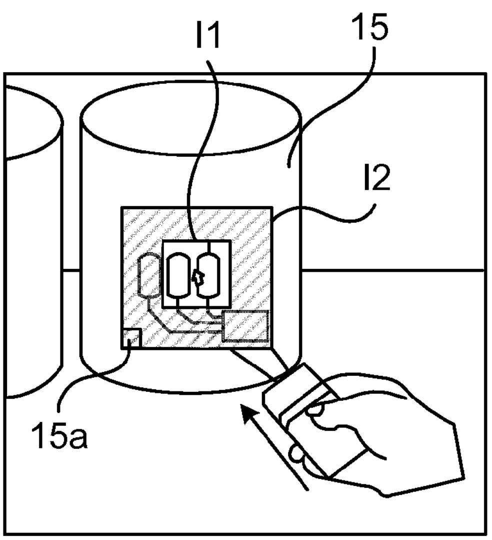
Figure 2C:
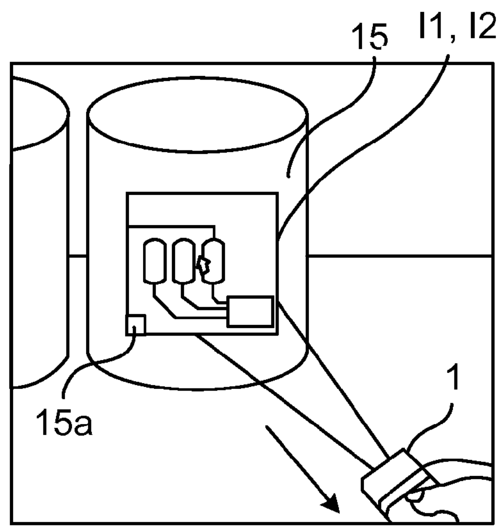
Figure 2D:
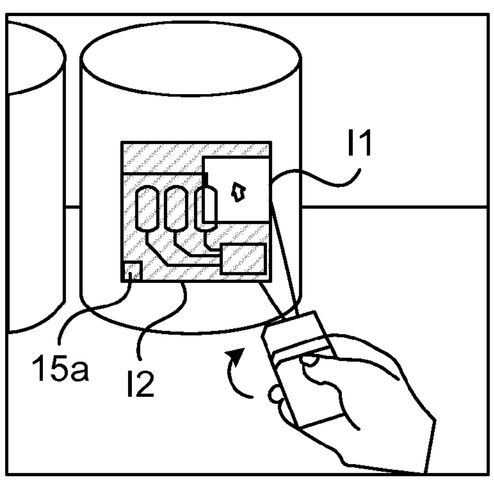

FIGS. 2*a-d* schematically show examples of the use of the portable device 1 in an industrial process environment. When a process engineer or other personnel intends to move into an industrial process environment 13, for example a plant, he or she brings with him/her the portable device 1. If the user of the portable device 1 wishes to monitor and/or control a process component 15 when the user is located in the industrial process environment 13 he or she points that end of the portable device 1 which is provided with the projector 11 towards the process component 15. The user may then turn on the projector by providing a user input, for example via the input unit 3, to the portable device 1 to project a process graphics image I1 onto the process component 15, as shown in FIG. 2*a*.

The process graphics image I1 projected onto the process component may form part of a larger process graphics I2 associated with the process component and which in its entirety can be projected onto the process component 15. In the example in FIG. 2*a* only a portion of the process graphics is visible, i.e. the process graphics image I1. The size of the process graphics image I1 relative to the maximal size of the process graphics I2 which can be projected onto the process component is dependent of the distance between the portable device 1 and the process component 15. Thus, the information contained in the process graphics image I1 projected onto the process component 15 depends on the distance between the portable device 1 and the process component 15. For example, according to one variation hereof, if the portable device 1 is located close to the process component 15 only a portion of the process graphics I2 will be shown in the projection as a process graphics image I1, while the entire process graphics I2 may be shown as a process graphics image if the distance is large enough.

According to one variation hereof, it is possible to navigate in the larger process graphics I2 by changing the pointing direction of the portable device 1. It is thus possible to decide which portion of the process graphics I2 is to be projected onto the process component 15 for visualisation. The navigation is effected by illuminating different portions of the process component 15 by means of the projector 11. Navigation is in other words obtained by pointing the portable device 1 in different directions towards the process component 15. FIG. **2*d*** shows the process graphics image I1 where the process graphics image I1 projected onto the process component is the upper right corner portion of the process graphics I2.

According to one variation hereof, navigation in any process graphics image I1 may be provided. In contrast to navigation in the process graphics I2 as described above, navigation in any particular process graphics image I1 does not result in a different portion of the process graphics I2 being projected. For this purpose, a cursor 17 may be displayed in any process graphics image I1 projected, allowing a user of the portable device 1 to move the cursor in the projected process graphics image I1 and to select objects displayed therein, such as a representation of the process component 15'. A user may for example move the cursor 17 by interacting with the input unit 3 of the portable device 1. Navigation in the process graphics I2 can hence be obtained by changing the direction in which the portable device 1, and in particular the projector 11 points, while navigation in a process graphics image I1 can be obtained by interacting with the input unit 3. Alternatively or additionally, it is contemplated that navigation in the process graphics I2 could be performed via the unit 3 for example by a user by maintaining a finger on the input unit and moving the finger for panning. In this case, selection between navigation in a process graphics image I1 by means of the cursor and navigation in process graphics I2 could for example be made by selecting the cursor by tapping it to thereby navigate in the process graphics image I1. If the cursor has not been selected, navigation, i.e. panning, in the process graphics I2 could be made by user input via the input unit.

The process graphics image I1 may comprise a representation of the process component 15'. According to one variation hereof, the representation of the process component 15 onto which the portable device 1 points and onto which the process graphics image I1 is projected is centred on the process component 15.

An external surface of the process component 15 may be provided with a tag **15*a*, for example a matrix barcode or a picture tag. The portable device 1 may for the purpose of reading the tag 15*a* be provided with a tag reader, for example a camera. Thereby, the process component 15 may be identified. Furthermore, the process graphics representation 15' in the process graphics image I1 may be centred on the process component 15** with the tag defining a reference point. Alternatively, the position and direction of the portable device could be determined in a coordinate system of the industrial process environment. This could for example be obtained by means of a positioning system and a gyroscope which according to one variation may be included in the portable device.

Figure 3:
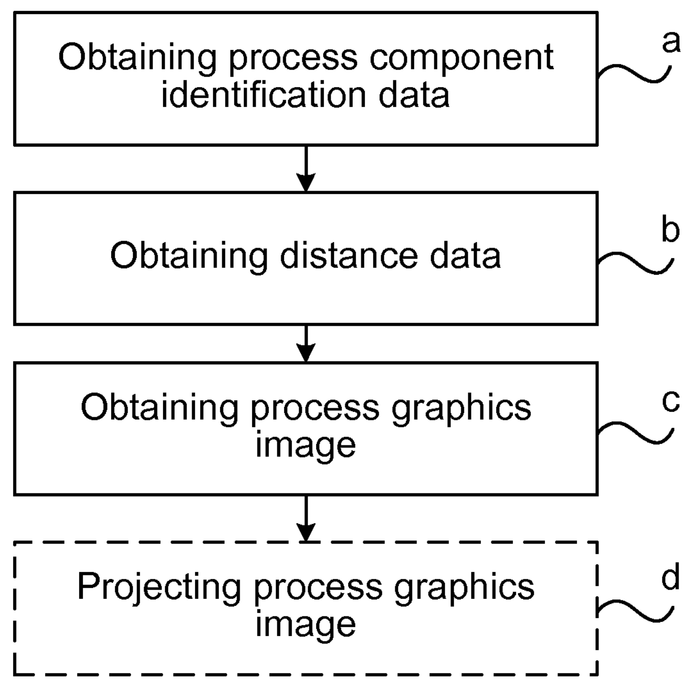
FIG. 3 shows a flowchart of methods for facilitating monitoring and control of an industrial process.

The method for facilitating monitoring and control of an industrial process will now be described in more detail with reference to FIG. 3. The steps are typically carried out while the portable device 1, and in particular the projector 11, is pointed towards or directed towards a process component 15.

In a step a) process component identification data for the identification of the process component 15 is obtained. The process component identification data may be obtained from a tag **15*a* arranged on the process component 15** or by a positioning/gyroscope system, as described above. Positioning and orientation of the portable device may for example be triggered when a user directs the portable device towards a process component and interacts with the input unit of the portable device. That process component which is closest to the portable device in the direction in which the projector points could for example be identified as the process component of interest. Identification data may, according to one variation be obtained by comparing positioning and orientation data of the portable device with the position of process components in the proximity of the portable device.

Step a) may be carried out by the processor 7 of the portable device 1 or, alternatively, by the industrial control system. In the latter case, the portable device may act as a data obtaining means which obtains data for identification of the process component but then wirelessly sends this data to the industrial control system for processing thereof, e.g. identification of the process component. Any of the following steps could equally well be performed by the industrial control system or by the portable device.

In a step b) distance data is obtained to determine the distance between the portable device and the process component 15. The distance data can according to one variation hereof be obtained by obtaining data from the tag **15*a* arranged on the process component 15 and comparing the data with reference data. For example, the data can relate to the size of the tag 15*a* as captured by the camera of the portable device, and the size of the tag as captured can be compared with a reference size of a tag. The distance of the portable device 1 from the tag 15*a* and thus the process component 15 can thereby be determined. Alternatively, the distance data may be obtained by determining the position of the closest process component in the direction in which the projector 11 points and comparing that position with the position of the portable device 1. As already noted above, step b) may be performed by the portable device 1** or the industrial control system.

In a step c) the process graphics image I1 is obtained. The process image I1 obtained is based on the process component identification data and the distance data. In particular, the process graphics image I1 is associated with a portion of the industrial process comprising the process component 15 and the information contained in the process graphics image I1 obtained in step c) is based on the distance between the portable device 1 and the process component 15 which has been identified by means of the identification data obtained in step a). The process graphics image I1 is then projected onto the process component 15 by the portable device 1 in a step d). In variations where step c) is carried out by the industrial control system, the process graphics image I1 is wirelessly provided to the portable device such that it may be projected by projector 11.

According to one variation, the size of the process graphics image which is projected is determined based on the obtained distance. For example, the process graphics image obtained in step c) may depict a larger portion of the process graphics I2 the greater the distance between the portable device 1 and the process component 15 is. Movement of the portable device towards and from a process component can thus be seen as a form of zooming operation. The zooming may advantageously be a continuous motion; however the zooming could be performed in discrete steps. It is envisaged that as an alternative or additionally, zooming could be performed by means of a pinching/spreading operation input by a user via the input unit 3.

According to one variation, an orientation of the projector 11 of the portable device 1 relative to the process component is obtained. This step may be performed before or after step b). In this case, in step c) the information contained in the process graphics image is further based on the obtained orientation. This results in the above-described navigation in the process graphics I2; projection of a specific portion of the process graphics I2 unless the distance between the portable device 1 and the process component 15 is so large that the entire process graphics I2 is displayed in the projected process graphics image I1. The step of obtaining the orientation of the projector of the portable device relative to the process component may comprise obtaining data from a tag 15*a* arranged on the process component 15. The orientation is then obtained based on the data obtained from the tag 15*a*. In particular, the location of the tag 15*a* obtained from the data may be compared with a reference location of a tag e.g. in a model of the process component, wherein the orientation of the projector 11 relative to the process component 15 towards which it is directed may be determined. As noted above, also this step may be performed by either the portable device or e.g. the industrial control system with which the portable device is adapted to communicate.

A user may provide a user input via the input unit 3 of the portable device 1, wherein a selection of a representation of the process component 15 displayed in the process graphics image I1 can be obtained. Thus, a user may select objects displayed in the process graphics image I1 by means of the cursor 17. By selecting an object, faceplates and other information available to process operators in a control room may become available and displayed in the process graphics image I1. Moreover, a user may input user commands to control objects displayed in the process graphics image I1, for example process component 15. Thus a further step may include obtaining a user command and controlling the process component based on the user command. Normally, this user command would be sent to the industrial control system for performing the control actions.

The present method and portable device hence allows process engineers to discuss matters concerning process monitoring and control in a simple manner, and user interaction with the industrial process may be obtained based on cooperative decision-making in an industrial process environment. The method and portable device may advantageously be utilised with industrial control systems such as DCS systems, SCADA systems or a combination of a SCADA system and DCS system. An example of an industrial control system in this context is the ABB® 800xA control system.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method for facilitating monitoring and control of an industrial process by means of a portable device comprising a projector arranged to project process graphics associated with process components of the industrial process, wherein the method comprises the steps of:

a) obtaining, by means of the portable device, process component identification data of a process component;

b) obtaining distance data for determining a distance between the portable device and the process component;

c) obtaining a process graphics image based on the process component identification data and the distance data for projection by the portable device, wherein the process graphics image is associated with a portion of the industrial process comprising the process component, and wherein information contained in the process graphics image is based on the distance between the portable device and the process component; and d) obtaining an orientation of the projector of the portable device relative to the process component, wherein in the step c) the information contained in the process graphics image is further based on the obtained orientation, wherein the step d) of obtaining an orientation of the projector of the portable device relative to the process component determines which portion of the process graphics describing the industrial process and containing a representation of the process component is obtained in the process graphics image in the step c).

2. The method as claimed in claim 1, further comprising the step of determining a size of the process graphics image based on the obtained distance.

3. The method as claimed in claim 2, further comprising the step of obtaining data from a tag arranged on the process component, wherein the step of obtaining the distance is based on the data obtained from the tag.

4. The method as claimed in claim 2, wherein the step a) of obtaining comprises obtaining identification data from a tag arranged on the process component.

5. The method as claimed in claim 1, further comprising the step of obtaining data from a tag arranged on the process component, wherein the step of obtaining the distance is based on the data obtained from the tag.

6. The method as claimed in claim 5, wherein the step a) of obtaining comprises obtaining identification data from a tag arranged on the process component.

7. The method as claimed in claim 5, further comprising the step of comparing a size of the tag with a reference size of a tag based on the data obtained from the tag arranged on the process component.

8. The method as claimed in claim 7, wherein the step a) of obtaining comprises obtaining identification data from a tag arranged on the process component.

9. The method as claimed in claim 1, wherein the step a) of obtaining comprises obtaining identification data from a tag arranged on the process component.

10. The method as claimed in claim 1, wherein the step d) of obtaining the orientation of the projector of the portable device relative to the process component comprises obtaining data from a tag arranged on the process component, wherein the orientation is obtained based on the data obtained from the tag.

11. The method as claimed in claim 10, further comprising the step of comparing a location of the tag with a tag of a reference model of the process component based on the data obtained from the tag arranged on the process component.

12. The method as claimed in claim 1, further comprising the step of projecting the process graphics image onto the process component.

13. The method as claimed in claim 1, further comprising the step of obtaining a selection, via the portable device, of a representation of the process component displayed in the process graphics image.

14. The method as claimed in claim 13, further comprising the step of obtaining a user command and controlling the process component based on the user command.

15. The method as claimed in claim 1, wherein the process graphics image provided in the step c) depicts a larger portion of the process graphics describing the industrial process the greater the distance between the portable device and the process component is.

16. The method as claimed in claim 1, further comprising the step of displaying a cursor in the process graphics image projected, allowing a user of the portable device to move the cursor in the process graphics image and to select objects displayed therein by interacting with an input unit of the portable device.

17. The method as claimed in claim 1, wherein the method is carried out by the portable device.

18. The method as claimed in claim 1, wherein the method is carried out by a control system of the industrial process.

19. A computer program embodied on a non-transitory computer readable medium and comprising computer-executable components for causing a portable device to perform the steps recited in claim 1 when the computer-executable components are run on a processor included in the portable device.

20. A portable device for facilitating monitoring and control of an industrial process, wherein the portable device comprises:

a projector; and a processor comprising computer executable components arranged to perform the steps of claim 1.

* * * * *